United States Patent [19]

Dempsey

[11] Patent Number: 4,493,207

[45] Date of Patent: Jan. 15, 1985

[54] METHOD AND APPARATUS FOR MEASURING THE RATE AT WHICH AIR INFILTRATES INTO AND OUT OF BUILDINGS

[75] Inventor: John C. Dempsey, Elliottville, N.Y.

[73] Assignee: Taggents, Inc., Kensington, Md.

[21] Appl. No.: 340,620

[22] Filed: Jan. 19, 1982

[51] Int. Cl.³ .............................................. G01M 3/20
[52] U.S. Cl. .................................................... 73/40.7
[58] Field of Search ...................... 73/40.7, 40; 222/54; 239/49, 53, 75, 145

[56] References Cited

U.S. PATENT DOCUMENTS

| | | |
|---|---|---|
| 3,325,318 | 6/1967 | Paullukonix . |
| 3,342,990 | 9/1967 | Barrington et al. . |
| 3,522,724 | 8/1970 | Knab ................................... 73/40.7 |
| 3,578,758 | 5/1971 | Altshuler ............................. 73/40.7 |
| 3,690,151 | 9/1972 | Briggs ................................. 73/40.7 |
| 3,920,987 | 11/1975 | Anbar et al. . |
| 3,962,916 | 6/1976 | Bouchy et al. ........................ 73/149 |
| 3,991,680 | 11/1976 | Dietz et al. . |
| 4,028,928 | 6/1977 | Van Dalen et al. ................. 73/40.7 |
| 4,080,822 | 3/1978 | Stenbäch ............................. 73/40.7 |
| 4,173,141 | 11/1979 | Kissell et al. ....................... 73/40.7 |

FOREIGN PATENT DOCUMENTS 0074482  7/1978  Japan .................................... 73/40.7

OTHER PUBLICATIONS

Condon, P. E., et al., "An Automated Controlled-Flow Air Infiltration Measurement System", *Building Air Change Rate and Infiltration Measurements*, ASTM STP 719, Hunt, C. M. et al., Eds., American Society for Testing and Materials, 1980, pp. 60–72.

Primary Examiner—Stephen A. Kreitman
Assistant Examiner—Joseph W. Roskos
Attorney, Agent, or Firm—James C. Wray

[57] ABSTRACT

Tracer emission sources which emit tracer gas at a predetermined constant known rate are distributed throughout a building. The preferred source is a small vessel containing a vaporous perfluorocarbon tracer (PFT) substance having a very small bore hole in the top through which the PFT vapor can escape. Time is permitted for the tracer gas to mix uniformly throughout the building and for its concentration to equilibrate with infiltrating air. The concentration of the tracer is then measured and compared to the known volume of air in the building to determine the infiltration rate. In the preferred mode, the concentration is integrated and measured by continuously sampling the tracer gas at a constant rate on activated charcoal adsorbent over a period of several weeks. The amount of tracer substance accumulated on the adsorbent at the end of the test is directly related to the average tracer gas concentration which existed in the building during the sampling period and it can therefore be used to calculate an average infiltration rate during that period.

26 Claims, 10 Drawing Figures

U.S. Patent        Jan. 15, 1985        4,493,207
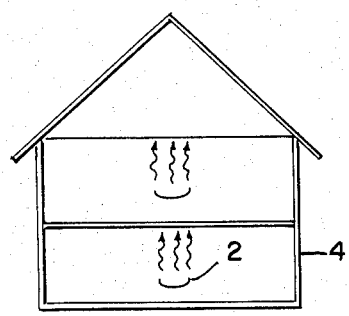
FIG. 1A
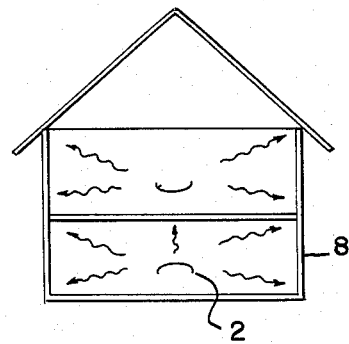
FIG. 1B
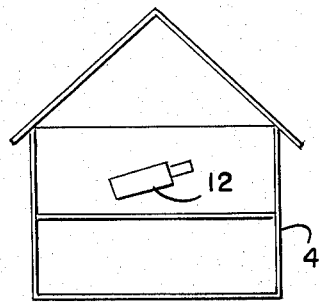
FIG. 1C
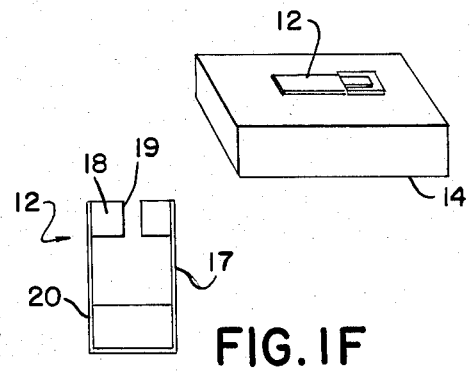
FIG. 1D
FIG. 1F
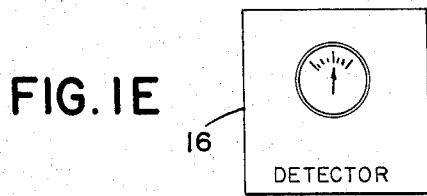
FIG. 1E
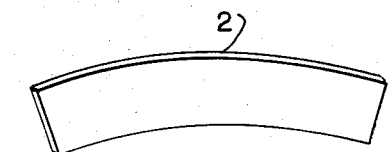
FIG. 2B
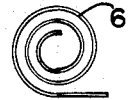
FIG. 2A
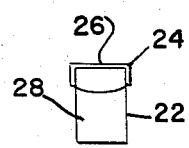
FIG. 2C
FIG. 2D

METHOD AND APPARATUS FOR MEASURING THE RATE AT WHICH AIR INFILTRATES INTO AND OUT OF BUILDINGS

BACKGROUND OF THE INVENTION

This invention relates generally to energy conservation in buildings and, more particularly, has reference to the use of tracer gases to measure the infiltration of air into buildings.

There is a growing need to control energy loss in homes and commercial buildings. A substantial energy loss is caused by infiltration of cold air into heated buildings during the winter and infiltration of hot air into cooled buildings during the summer. Using currently available methods, it is very difficult, time consuming, and costly to measure the amount of such infiltration and to locate the leakage points. It is especially difficult to establish an average infiltration value over an extended period of time because the leakage rate changes substantially when weather or temperature changes occur. To accomplish this using current methods requires technicans to remain in the building in question while they make repeated measurements over an extended period of time using complicated and expensive instruments.

The tracer dilution method is the most common method used today for infiltration rate measurement. It requires the release of a batch of tracer gas, usually sulfur hexafluoride. The gradual reduction in tracer gas concentration caused by air infiltration is measured at several precisely timed intervals and used to calculate the infiltration rate. This technique is very costly for making long term measurements because the expensive measurement equipment must be kept on location continuously. Its accuracy is also very dependent on the skill of the technicians who apply it in the field.

In another technique, called the constant rate method, tracer gas is injected continuously as in the present invention, but its rate of injection is varied to maintain a constant or equilibrium tracer gas concentration in the building being tested. The changes in the injection rate required to maintain the equilibrium concentration are continuously recorded and used to calculate the infiltration rate. This method also requires expensive real-time measurement instruments in the building throughout the test.

SUMMARY OF THE INVENTION

The present invention is an entirely new methodology for infiltration measurement in that it utilizes a source of tracer gas which emits at a constant, known rate. Accordingly, the method will be referred to hereafter as the constant source method. After the tracer source is placed in the building at least 4 hours are allowed to permit the tracer gas to mix uniformly throughout the building and come to an equilibrium concentration in the contained air. The value of this equilibrium concentration is controlled by (1) the source emission rate, (2) the building volume and (3) the rate at which outside air is displacing inside air (infiltration rate). Since the first two of these three controlling factors are known and constant, a measurement of the equilibrium tracer gas concentration can be used to calculate the third factor; viz., the air infiltration rate.

The present invention overcomes many of the problems which exist in the prior art. The invention provides a simple low cost method and apparatus for measuring average building infiltration rates over an extended period of time.

One or more tracer emission sources are distributed throughout a building. In the preferred mode, an adsorbent sampler which samples the tracer at a constant rate is then placed in the building for a predetermined time interval. The sampler is then sent to a laboratory where the tracer is completely purged from the adsorbent and measured. This quantity is used to calculate the average rate of air infiltration into the building during the sampling period. The method can also be used to obtain the instantaneous infiltration rate by using real time instruments to measure the tracer concentration after it has equilibrated. Any tracer gas can be employed which can be conveniently measured in low concentrations.

An object of the invention is, therefore, to provide a new constant source method and apparatus for measuring air infiltration into buildings.

Another object of the invention is to provide a new method and apparatus for measuring air infiltration which can be conveniently and cheaply carried out by homeowner.

Another object of the invention is to provide a constant emission rate source useful in a constant source method for measuring air infiltration rate in buildings.

Yet another object of the invention is to provide a constant emission rate source which can easily be adjusted to provide the proper emmission rate for buildings having different volumes and for large buildings having many rooms.

Yet another object of the invention is to provide a constant emission rate source in which the emission rate is adjustable by dilution of the tracer source material.

A further object of the invention is to provide a method of measuring air infiltration rate into an enclosed area comprising placing in the area a tracer source which emits tracer gas at a substantially constant rate, sampling the tracer concentration in the building over a known period of time, and measuring the tracer in the sample.

Still another object of the invention is to provide a constant emission rate tracer gas source comprising a polytetrafluoroethylene material impregnated with a perfluorocarbon compound.

A further object of the invention is to provide tracer emission apparatus adapted for use in a constant source method of measuring air infiltration rate into an enclosure comprising a rod or ribbonlike strip of elastomeric material substantially uniformly impregnated with tracer substance, said strip being severable to lengths productive of desired tracer gas emission rates.

Another object of the invention is to provide a technique for measuring air infiltration having tracer gas release and sampling requirements which can be easily carried out by an average homeowner.

Another object of the invention is to provide an infiltration measurement technology having small tracer gas source and sampling apparatus which can be easily and cheaply mailed to homeowners and return mailed by them to ta central analytical laboratory.

A still further object of the invention is to provide a liquid source of tracer gas which emits at a constant rate over a period of at least six weeks.

These and other and further objects and features of the invention are apparent in the disclosure which includes the above and below specifications and claims and drawings.

BRIEF DESCRIPTION OF THE DRAWINGS

FIGS. 1A–1E are diagrammatic illustrations of steps of the present invention.

FIG. 1F is a schematic view of an absorbent sampler.

FIGS. 2A and 2B are top views of the impregnated rod or ribbonlike material.

FIGS. 2C and 2D schematically show orificed liquid and gas sources which can be used as a tracer gas source in the present invention.

DETAILED DESCRIPTION OF THE INVENTION

The present invention consists in a new method and apparatus for measuring the rate of air infiltration into and out of buildings. It involves the release of a tracer gas into a house or large building at a constant rate and measuring the average tracer concentration over a known period of time. The rate of infiltration during the measurement period can then be calculated from a measurement of the average tracer concentration value during that period. Since the infiltration rate varies in all buildings as weather conditions change, an integrated measurement over an extended period of time is needed to obtain an average value.

The theoretical basis for the constant emission rate method is as follows:

If a constant rate of tracer gas is added throughout a building and a constant rate of the tracer is leaking out of the building, the total amount of tracer in the building at any time can be obtained by solving the following differential equations:

$$dA(t)/dt = K - QC(t) \tag{1}$$

where $A(t)$ is the total amount of tracer in the building at time $t$, $K$ is the constant rate of tracer addition, $Q$ is the constant volumetric flow rate out of or into a building, and $C(t)$ is the exit concentration of tracer leaving the building at time $t$.

The following differential equation also applies:

$$dA(t)dT = K - (Q/V)A(t) \tag{2}$$

where $V$ is the total volume in the building. The term $(Q/V)A(t)$ can be taken as the rate that tracer leaves the building as a direct consequence of the perfect mixing assumption. The solution to Eq. 2 is $$A(t) = (KV/Q)1 - \exp(-Qt/V) \tag{3}$$

It has been shown that when $t$ is sufficiently large, e.g., when $t$ exceeds about 3 to 4 hours, one can assume that a satisfactory equilibrium condition exists. Hence, this solution reduces to:

$$A(t) = A - KV/Q \tag{4}$$

Assuming no change in the amount of total tracer gas in the house over a long time interval, Eq. 4 can also be solved as follows:

$$dA(t)/dt = o = k - (Q/V)A(t)$$

or $K = QA/V$ and $$A = KV/Q \tag{5}$$

Equation 4 or 5 can be arranged to give $$A/V = K/Q \tag{6}$$

A direct measurement of $A/V$ can be made by obtaining the tracer concentration in the building at any time after the tracer sources have been operating sufficiently long enough to insure that equilibrium has been established.

From the known values of $A/V$ and $K$, a value of $Q$ can be obtained from a rearrangement of either Eq. 4, Eq. 5, or Eq. 6. The rearrangement gives:

$$Q = KV/A \tag{7}$$

$V$, the volume of the building, can be calculated from the known dimensions of the building. The "air turnover" or air infiltration rate, $T$, in the building, then, is simply:

$$T = Q/V \tag{8}$$

where $T$ is the number of complete air renewals in the building per unit time. The validity of this constant source method requires that the tracer emission rate be known and that it be substantially constant during the measurement period.

Properly applied, the constant source method can overcome many of the limitations of earlier methods. Moreover, the source and sampling apparatus are small and can be mailed to the home or building owner who can easily use them to carry out the tracer gas release and sampling steps on a "do-it-yourself" basis.

In two embodiments, the tracer sources consist of containers filled with a gaseous or a liquid tracer substance and having very small bored holes in one end sized to permit a constant small release of the tracer gas. In each case, the tracer gas or vapor escapes through the hole at a substantially constant rate. When very small release rates are desired, an elongated or tubular hole is used to further restrict the escape of the tracer gas.

In another embodiment, the tracer emission source consists of a solid which has been impregnated with the gaseous or liquid tracer substance. Impregnated solids of this type are easy to handle and can be cut to make sources having any desired emission rate. For example, many fluoropolymer solids such as polytetrafluoroethylene, have been impregnated with certain gases, such as SF, and many fluoroelastomers, such as Vitron, have been impregnated with certain vaporous liquids, such as perfluorocarbon tracer (PFT) compounds. These solids have been found to reemit the tracer substances as gases at low, predictable rates for many years.

Preferably, the solid emission sources are rod or ribbonlike strips of elastomeric material which have been substantially uniformly impregnated with tracer. Polytetrafluoroethaylene is useful as the elastomeric material and PFT is useful as the tracer. Tracer gas is emitted from the material at a substantially constant rate under constant temperature conditions. The desired tracer emission rate can be established by choosing the length of the impregnated strips.

The present invention can be best understood by reference to the drawings.

In step 1 (FIG. 1A), tracer emission sources 2 are distributed throughout a building 4. Each source 2 is adjusted to emit tracer gas at a rate corresponding to the volume of the room or that portion of the building in which it is placed. Usually one story homes require one source while two story homes require one upstairs and one down. It is possible to measure infiltration rates for very large multi-room buildings, by distributing properly adjusted sources throughout the building.

PFT compounds are the preferred tracer for use in the present invention. However, SF or other tracer substances can be used. Several different tracers can be employed simultaneously for special applications.

In step 2 (FIG. 1B), tracer gases 8 are emitted from the sources 2 at a substantially constant rate for a period of at least 4 hours to permit the tracer to mix uniformly with air in the room.

In step 3 (FIG. 1C), gas samples are taken at one or more locations in the building by exposing adsorbent samplers 12 to the tracer gas inside the building 4. By taking separate samples in each room of the house, it is possible to determine where the infiltration is occuring. The samplers 12 contain an adsorbent material, such as activated charcoal, which absorbs tracer from the air at a substantially constant rate. Sampling in direct proximity to the sources 2 is avoided. The samplers 12 are usually left in the building for 4 to 6 weeks. This long sampling period is not necessary but aids in obtaining an "average" infiltration rate since the rate changes with weather conditions. The samplers 12 are then hermetically sealed and, in step 4 (FIG. 1D), they are placed in packages 14 and sent to a laboratory for analysis. The total volume of the building tested and the testing period are noted on the package 14 prior to shipment for analysis.

In step 5 (FIG. 1E), the adsorbent material in the samplers 12 is heated or otherwise treated to remove all of the adsorber tracer gas. The purged gas is quantitatively measured by the detector 16 and compared to the volume of the area. The detector is preferably a commercially available gas chromatograph/ionization detection system because of the high sensitivity of these instruments to the preferred tracer gases.

Absorbent sampler 12 (FIG. 1F) has a container 17 and a stopper 18 with an orifice 19. Absorbent material 20, such as activated charcoal, is held within the container.

FIGS. 2A-D show tracer sources. FIG. 2A shows a coil 6 from which lengths of ribbon 2 (FIG. 2B) may be cut. FIG. 2C shows container 22 with a tight lid 24 having an orifice 26. A liquid 28 in the container 22 releases tracer gas at a known rate. FIG. 2D shows a gas container 30 with a valve 32 to release tracer gas at a controlled rate or to open an orifice.

The air infiltration rate into the building is calculated from the data gathered in steps 1-5. The calculations needed were generally discussed above.

It is useful to compare the equipment and procedures needed for the present invention with those needed for the tracer dilution technique.

At least three sampling steps are needed in the dilution technique. Only one sampling step is required for the present invention. Samples for the dilution method must be measured on the spot in real time or taken and shipped for analysis in large bags. The PFT used in the present invention can be readily adsorbed and desorbed on small adsorbent samplers which are cheap and simple to ship. The SF gas generally used in the dilution technique will not sorb or desorb on an adsorbent quantitatively so that bags must be used for sampling.

The precise time of such sampling or concentration measurement must be obtained in the dilution technique. Only the overall sampling time is required in the present invention. With the dilution method, many gas releases and concentration measurements are required to record the different infiltration rates which occur under each different weather condition in order to obtain an average value. In the present invention only one source and sampler positioning at the begining and one collection at the end are required to obtain an average infiltration rate value for the entire test period. The foregoing advantages of the present invention add significantly to its relative simplicity and accuracy and thus facilitate its proper application by homeowners on a "do-it-yourself" basis.

Another advantage is the small size of the mailing package needed in the present invention versus the several larger packages needed for air samples when applying the dilution technique over equivalent periods. This, of course, reduces mailing costs.

A further advantage of the present invention is the fact that the tracer gas sources emit continuously. This makes it easier to find the location of leaks by comparing samplers from different areas within a building or by measuring specific locations with a real-time detector where the source is in place.

The ion mobility instruments used in both the present invention and the dilution technique are about 100,000 times more sensitive to the perfluorocarbons preferred in the present invention than they are to the SF used in dilution technique. Thus, far less tracer gas is required in applying the present invention.

Aspects of the present invention will now be described in greater detail.

The tracer source can be either a gas, a vaporous liquid or a solid elastomer impregnated with the gas or liquid tracer substance. The preferred tracer substances have an electron deficient molecule so as to be easily and sensitively measurable by the electron capture detection technique. Examples of such compounds are sulfur hexafluoride, the perfluorocarbons and certain freon compounds.

Compounds which are non-toxic are preferred for use in the present invention. The inhalation and oral toxicity of several candidate PFT compounds have been analyzed. Tables 1 and 2 below summarize the results.

TABLE 1

| Inhalation Toxicity Data for Various Taggents | | |
|---|---|---|
| Taggent | Type* | Value |
| HFB | LDLo | 11 ppm for 2 hr in mice |
| OFT | LDLo | 5000 ppm for 10 min in mice |
| DFCH | LCLo | 8000 ppm in mice |
| OFCP | LCLo | 30000 ppm in mice |
| PDCH | No effect | 4% for 6 hr in rats |
| PMCH | No effect | 2% for 6 hr in rats |
| E-1 | No effect | 3.3% for 4 hr in rats |

*LDLo = Lowest Published Lethal Dose
LCLo = Lowest Published Lethal Concentration

TABLE 2

| Oral Toxicity Data for Various Taggents | | |
|---|---|---|
| Taggent | Oral White Mice | Toxicity Rating |
| OFN | 670 mg/kg | moderately toxic |
| PFP | 280 mg/kg | very toxic |
| HFB | 710 mg/kg | moderately toxic |
| PMCH | 100 g/kg | practically non-toxic |
| PDCH | 100 g/kg | practically non-toxic |

TABLE 2-continued

Oral Toxicity Data for Various Taggents

| Taggent | Oral White Mice | Toxicity Rating |
|---|---|---|
| Freon E1 | 25 g/kg | practically non-toxic |
| Freon E2 | 25 g/kg | practically non-toxic |
| PFD | 200 g/kg | practically non-toxic |

As shown in the tables, the perfluoroalkanes are practically non-toxic so these are the preferred tracer substances. Several fluoroaromatic taggents are toxic, especially PFP (pentafluoroplyridine) so these are thus not preferred.

Materials useful as the rod or ribbonlike substrate for solid impregnation in the constant sources for the present invention were discussed earlier. In the preferred embodiment of the invention, the material is an elastomer or fluoropolymer material. Polytetrafluoroethylene has proven particularly effective.

Relatively low cost equipment is used to impregnate the substrate with the tracer substance. Commercially available compressors and laboratory pressure/temperature bombs can be used to impregnate the substrate with either gaseous or liquid tracer substances. Experience has shown that such equipment is adequate to accommodate the modest temperature and pressures, e.g., 125 C and 15 atmos., needed for the impregnation process.

Impregnation temperature, pressure, and timing all affect the amount and penetration of the tracer substance in the substrate. The optimum impregnation parameters have been well quantified for both gaseous and liquid tracer compounds. Simple modifications in preparation parameters can be used to produce sources having widely different emission rates, e.g., impregnating with different tracer-solvent mixtures.

Using the methodology described above to uniformly impregnate long lengths of ribbonlike or rodlike substrate material results in elongated emission sources which can be cut to different lengths in order to produce correspondingly different tracer gas emission rates. Such source emission tailoring permits the matching of source emission rates to the volume of the groups of rooms or buildings being tested. This feature is especially valuable where multiple sources must be deployed, e.g. in measuring the infiltration rate in large buildings.

With the dilution technique, tracer concentrations in upstairs rooms were found to be consistently lower than concentrations in downstairs rooms when the tracer was released downstairs. This was attributed to reduced convective mixing between the two zones. This problem can be avoided using the present invention by placing sources having equal emission at least on each floor as described above.

The tracer emission rate from the preferred tracer source types (liquids or impregnated plastics) increases substantially as temperature increases (almost 2 fold for a 25° F. temperature increase). The emission rate of the solid sources also diminishes predictably with time (15 to 20% over two months). Accordingly, when using these source types means should be employed to eliminate or compensate for these emission changes if highly accurate results are required. The temperature limitation can be eliminated by maintaining the source at a substantially constant temperature during the test period. Another way is to use two different tracer substances or source types which exhibit substantially different changes in emission rates as a function of temperature. If the rate differences are well characterized, the additional amount of tracer material collected from the more temperature dependent source can be used to correct the infiltration rate data derived from the less temperature dependent tracer material.

The diminution in the emission of the tracer impregnated solid sources with time is not significant for most applications. However, in instances where high accuracy is required, the initial source emission rate can be restored periodically throughout the test by adding other small pieces of impregnated material having sufficient emission to bring the total emission back to the initial value. This is done in practice by supplying the user with a series of pre-cut lengths of the same impregnated rod or ribbon used for the initial source with instructions to place them beside the initial source at predetermined time intervals; e.g., one each week. Since each inch of rod is emitting tracer gas at the same known rate initially, supplemental sources having the proper emission can be made by cutting pieces of proper length with respect to the initial source length.

Other means for maintaining a constant emission rate can be provided through proper source design, as detailed in a co-pending patent application entitled *Method and Apparatus for Measuring Air Infiltration Rate into Buildings* filed by Lorin R. Stieff and John C. Dempsey.

Much of the tracer measurement technology used in the present invention has been developed. For example, passive diffusion (PD) samplers are the preferred method of tracer sampling in the present invention.

PD samplers require no outside power source. Rather, the tracer gas moves into the device by well known principles of gas diffusion; i.e., the tracer diffuses into the device to equilibrate the inside as outside concentrations according to Fick's Diffusion Law. However, as tracer molecules reach the adsorbent inside, they are immediately captured so that the higher outside tracer concentration is never reached inside the device. Thus, a continuous pumping action is effected. The theory for the design of such samplers is well known.

Such PD samplers are now commercially available as personal monitoring badges which are worn by workers to determine their exposure to certain noxious gases over an eight hour period. However, the sampling rate for the present invention must be low enough so that sampling continuously for four to six weeks will not saturate the adsorbent material. This is accomplished by reducing the size of the opening through which the tracer substance enters the device.

The resulting samplers are small, low in cost, rugged and can be sent to users by mail. They are not affected appreciably by the changes in surrounding temperature or barametric pressure. Accordingly, they are well suited for use in the present invention.

Analytical interference from competing vapors which co-adsorb on the adsorbent with the tracer gas can be minimized by decomposing such vapors catalytically during the purging process and by selectively adsorbing the tracer from the purge gas stream by well known techniques. Methods and apparatus useful in the tracer purging step are well known for PFT removal from charcoal. Accordingly, activated charcoal is the preferred adsorbent material.

While the invention has been described with reference to specific embodiments, the exact nature and scope of the invention is defined in the following claims.

I claim:

1. A method of measuring air infiltration rate into and out of an enclosed area comprising
   placing tracer substance in the area,
   emitting tracer gas at a substantially constant rate over a period of time,
   sampling gaseous content of the area, and
   measuring tracer in the sample.

2. The method of claim 1 wherein the placing tracer substance comprises placing elastomeric material impregnated with tracer.

3. The method of claim 2 wherein placing the elastomeric material comprises placing polytetrafluoroethylene material, and
   the tracer comprises a perfluorocarbon compound.

4. The method of claim 1 wherein the placing tracer substance comprises placing a perfluorinated compound.

5. The method of claim 1 wherein the placing tracer substance comprises placing a perfluorocarbon compound.

6. The method of claim 1 wherein the step of sampling gaseous content of the area comprises
   providing adsorbent means for continuously adsorbing tracer from the gaseous content of the area,
   placing the adsorbent means in the area, and
   exposing the adsorbent means to the gaseous content of the area for an extended period of time.

7. The method of claim 6 wherein the adsorbent means comprises activated charcoal adsorbent material.

8. The method of claim 6 wherein the step of measuring tracer comprises purging tracer from the adsorbent means and measuring the purged tracer in a gas chromatograph/ionization detector.

9. The method of claim 8 wherein the purging step comprises heating the adsorbent means.

10. The method of claim 6 further comprising hermetically sealing the adsorbent means after the means is exposed to the gaseous content for the extended period of time.

11. The method of claim 6 wherein
    the tracer substance comprises polytetrafluoroethylene material impregnated with a perfluorocarbon compound,
    the adsorbent means comprises activated charcoal adsorbent material, and
    the step of measuring tracer comprises purging tracer from the adsorbent means and measuring the purged tracer in a gas chromatograph/ionization detector.

12. The method of claim 1 wherein the step of placing tracer substance comprises
    providing a ribbonlike strip of elastomeric material substantially uniformly impregnated with tracer, and
    cutting the strip to a length productive of a predetermined constant tracer gas emission rate.

13. The method of claim 12 wherein the tracer gas emission rate corresponds to the volume of the enclosed area.

14. The method of claim 12 wherein the elastomeric material comprises a fluoropolymer material.

15. The method of claim 12 wherein the elastomeric material comprises polytetrafluoroethylene material.

16. The method of claim 12 wherein the tracer comprises a perfluorinated compound.

17. The method of claim 12 wherein the tracer comprises a perfluorocarbon compound.

18. The method of claim 12 wherein
    the elastomeric material comprises polytetrafluoroethylene material, and
    the tracer comprises a perfluorocarbon compound.

19. Tracer emission apparatus adapted for use in a constant flow method of measuring air infiltration rate into an enclosure comprising a ribbonlike strip of elastomeric material substantially impregnated with tracer, said strip being severable to a length productive of a desired tracer gas emission rate.

20. The apparatus of claim 19 wherein the elastomeric material comprises a fluoropolymer material.

21. The apparatus of claim 19 wherein the elastomeric material comprises polytetrafluoroethylene material.

22. The apparatus of claim 19 wherein the tracer comprises a perfluorinated compound.

23. The apparatus of claim 19 wherein the tracer comprises a perfluorocarbon compound.

24. The apparatus of claim 19 wherein
    the elastomeric material comprises polytetrafluoroethylene material, and
    the tracer comprises a perfluorocarbon compound.

25. A method of measuring air infiltration rate into and out of a building comprising placing tracer substance in a building, emitting tracer gas at a substantially constant rate over a period of time, sampling gaseous content of the building and measuring tracer in the sampled gaseous content of the building.

26. A method of measuring air infiltration rate into and out of a building comprising placing tracer substance in the building and emitting tracer gas within the building over a period of time, continuously sampling gaseous content of the building and measuring tracer in the sampled gaseous content.

* * * * *